United States Patent [19]

Matsumoto et al.

[11] Patent Number: 4,941,677
[45] Date of Patent: Jul. 17, 1990

[54] INDEPENDENT WHEEL SUSPENSION SYSTEM

[75] Inventors: Yoshiyuki Matsumoto; Kanji Kubo, both of Saitama, Japan

[73] Assignee: Honda Giken Kogyo Kabushiki Kaisha, Tokyo, Japan

[21] Appl. No.: 230,081

[22] Filed: Aug. 9, 1988

[30] Foreign Application Priority Data

| Aug. 10, 1987 | [JP] | Japan | 62-199513 |
| Aug. 10, 1987 | [JP] | Japan | 62-199514 |
| Aug. 10, 1987 | [JP] | Japan | 62-199515 |
| Aug. 10, 1987 | [JP] | Japan | 62-122270[U] |
| Aug. 10, 1987 | [JP] | Japan | 62-122271[U] |
| Sep. 4, 1987 | [JP] | Japan | 62-221380 |

[51] Int. Cl.$^5$ .............................. B60G 3/18
[52] U.S. Cl. .................... 280/690; 280/691; 280/696; 280/703
[58] Field of Search ............... 280/690, 688, 701, 705, 280/691, 696

[56] References Cited

U.S. PATENT DOCUMENTS

| 4,327,927 | 5/1982 | Tanaka | 280/691 |
| 4,377,298 | 3/1983 | Finn et al. | 280/696 |
| 4,440,420 | 4/1984 | Muller | 280/691 |
| 4,457,537 | 7/1984 | Ohe et al. | 280/675 |
| 4,671,531 | 6/1987 | Sautter et al. | 280/690 |
| 4,715,614 | 12/1987 | Kijima et al. | 280/690 |
| 4,772,043 | 9/1988 | Muramatsu | 280/690 |

FOREIGN PATENT DOCUMENTS

| 52-9889 | 3/1977 | Japan . |
| 2172254 | 9/1986 | United Kingdom | 280/691 |

Primary Examiner—Richard A. Bertsch
Attorney, Agent, or Firm—Armstrong, Nikaido, Marmelstein, Kubovick & Murray

[57] ABSTRACT

An independent wheel suspension system includes a pair of upper lateral link members and a pair of lateral link members for supporting a wheel carrier to the vehicle body. By providing a difference in elevation between the outer ends of the link members for the upper and/or the lower pair of lateral link members, an antidive property can be obtained. Further, by providing an appropriate inclination to the rear lower lateral link member, the tendency to form a toggle between the knuckle arm of the wheel carrier and the tie rod is reduced. Also, by making the front lateral link member more upwardly inclined than the rear lateral link member for each of the pairs, an anti-dive effect can be produced without changing the caster angle and other property of the suspension system during cornering maneuvers.

16 Claims, 14 Drawing Sheets

INDEPENDENT WHEEL SUSPENSION SYSTEM

TECHNICAL FIELD

The present invention relates to an independent wheel suspension system, in which an upper and lower parts of the wheel carrier rotatably supporting a wheel are coupled to the vehicle body by way of a pair of upper lateral link members and a pair of lower lateral link members, respectively, which extend laterally of the vehicle body, and in particular to such a wheel suspension system having an improved anti-dive property.

BACKGROUND OF THE INVENTION

As a geometrical structure for reducing the so-called nose-diving of a vehicle or the dropping of the front part of the vehicle when a sudden braking action has taken place, there are known several forms of anti-dive geometry in which the caster angle of the front wheels is increased as the wheel moves toward the bump condition (compressed state of the suspension system).

In order to accomplish such a dynamic change in the wheel alignment with a double wishbone suspension system in which upper and lower parts of the wheel carrier are coupled to the vehicle body each by way of a lateral A-arm, the rotational axial lines of the upper and the lower lateral arms with respect to the vehicle body are made to intersect each other at a point located behind the axle and above the point of contact between the wheel and the road surface or, in other words, the rotational axial line of the upper lateral link members with respect to the vehicle body is given with an upward inclination towards the front. Alternatively, the rotational axial line of the lower lateral link members with respect to the vehicle body is arranged in parallel with the longitudinal center line of the vehicle body while the rotational axial lines of the upper lateral link members of the right and the left suspension system with respect to the vehicle body are made to intersect each other ahead of the front axle line.

However, according to this concept, the points of pivotal attachment of the upper lateral arm with respect to the vehicle body must be offset from each other along the vertical or the lateral direction, and it may create such problems as producing a dead space in the engine room, making it difficult to ensure sufficient rigidity to the suspension structure due to the complication of the shapes of the mounts of the upper lateral arm, and so on.

As a suspension system for a steerable wheel which satisfies the requirements related to driveability and running stability of a vehicle and minimizes the space required to accommodate the motion of the wheel, there has been proposed a structure which, for instance as disclosed in Japanese patent publication No. 52-9889 (which is based on Austrian patent application No. 8125/68), have two pairs of lateral link members, one of the pairs connecting an upper part of the wheel carrier to the vehicle body while the other pair connect a lower part of the wheel carrier to the vehicle body. The wheel which is supported by means of such a linkage mechanism is steered about instantaneous centers of rotation as given by points of intersection of the lines each defined by connecting the pivot points of the corresponding lateral link member with respect to the vehicle body and the wheel carrier. Because such a suspension system offers a considerable freedom in design, it is possible to give a favorable dynamic property to the wheel alignment with appropriate geometric arrangement of the lateral link members and their pivot points. For instance, it is possible to change the caster angle of the wheel as the wheel undergoes a vertical motion so as to produce an anti-dive effect.

On the other hand, in case of a steerable wheel, since each wheel undergoes a relative vertical displacement also during a rolling motion of the vehicle, the force required to maintain a steering angle may change during a cornering action in a suspension system in which the caster angle changes according to the vertical motion of the wheel.

Further, a steerable wheel is typically steered by means of a tie rod extending laterally of the vehicle body and connected to a knuckle arm projecting from the wheel carrier along the fore-and-aft direction of the vehicle so as to transmit the torque applied to the steering wheel to the steered wheel by way of the lateral displacement of the tie rod. When the relationship between the knuckle arm which protrudes rearwardly and the tie rod connected thereto during a steering action is considered, one can see that the distance between the extension of the line connecting the two pivot points of the tie rod and the imaginary king pin center is closer for the inner wheel or, in other words, the knuckle arm of the inner wheel tends to form a toggle with the tie rod. This not only tends to cause an unfavorable change in the torque required to perform the steering action but also limits the maximum steer angle of the steerable wheel.

Yet further, a suspension system is generally required to have the capabilities to isolate the vehicle body from the vibrations arising from the irregularities of the road surface, and to ensure a driving stability by achieving a solid grip between the wheel and the road surface. It is therefore essential to achieve these two goals at as high levels as possible in designing a suspension system. Now, it is known that coinciding the imaginary king pin as given by the imaginary centers of rotation of the upper and lower parts of the wheel carrier with the center of the tire contact surface is effective in improving the capability of the vehicle to run straight ahead and reducing the force required to perform a steering action, and it is considered desirable to minimize the movement of the intersection between the imaginary king pin and the road contact surface during a steering action in order to reduce any irregular change in the force required to perform a steering action.

If the trajectory or the travel of the upper instantaneous center of rotation is made relatively long while the trajectory of the lower instantaneous center of rotation is made relatively short, for a given steering input, the position of the imaginary king pin during the steering action changes along a substantially conical surface created by a generatrix consisting of the imaginary king pin, and the travel of the trajectory of the intersection between the imaginary king pin and the road surface is minimized as discussed in a copending U.S. patent application Ser. No. 135,250.

Such a property can be obtained by appropriately selecting the spacing of the pivot points of the upper lateral link members with respect to the wheel carrier and the corresponding spacing of the lower lateral link members. As for the lower lateral link members, the fore-and-aft spacing of their pivot points at the wheel carrier is desired to be minimized. However, the pivot points consists of balls joints and, conventionally, it has not been possible to bring them sufficiently close to each other without causing an interference between them. As for the upper lateral link members, it is necessary to achieve a desired geometrical arrangement without reducing the mechanical strength of the wheel carrier. This is not always possible because a relatively large fore-and-aft and/or vertical spacing is required at a relatively upper part of the wheel carrier.

BRIEF SUMMARY OF THE INVENTION

In view of such problems of the prior art and the findings of the inventors, a primary object of the present invention is to provide an independent wheel suspension system which can simplify the vehicle body structure at the points of pivotal attachment between the upper lateral link members and the vehicle body, and offers a favorable anti-dive geometry.

A second object of the present invention is to provide an improved wheel suspension system which maximizes the toggle margin between a knuckle arm and a tie rod during a steering action.

A third object of the present invention it to provide an improved wheel suspension system which can achieve the riding comfort and the driving stability both of relatively high levels.

A fourth object of the present invention is to provide an improved wheel suspension system which can achieve an anti-dive geometry without affecting the force required to steer the wheel during a cornering action.

A fifth object of the present invention is to provide an improved wheel suspension system which permits relatively free selection of the pivot points of a pair of lateral link members on an upper part of a wheel carrier without involving any problems related to the mechanical strength of the wheel carrier.

A sixth object of the present invention is to provide an improved wheel suspension system which can even further expand the freedom in selecting the travel of the imaginary king pin resulting from a steering action.

According to the present invention, these and other objects of the present invention can be accomplished by providing a wheel suspension system, wherein an upper and a lower part of a wheel carrier, rotatably supporting a wheel, are coupled to a vehicle body by way of upper lateral link device and lower lateral link device, respectively, wherein: the upper lateral link device comprises a pair of upper lateral link members, arranged one behind the other, having inner ends pivotally attached to the vehicle body at a substantially same elevation and outer ends which pivotally attached to the wheel carrier at mutually different elevations.

Thus, according to this aspect of the present invention, as a result of a vertical motion of the wheel, the distances covered by the outer ends of the upper lateral link members as projected upon a vertical plane differ from one another. According to another aspect of the present invention, the outer end of the front upper lateral link member is placed at substantially the same elevation as the inner ends of the upper lateral link members while the outer end of the rear upper lateral link member is located higher than the outer end of the front upper lateral link member when the wheel suspension system is in a neutral state. In this case, since the vertical travel of the outer end of the rear upper lateral link member is less than that of the outer end of the front upper lateral link member as the wheel moves toward the bump condition, the wheel is turned relative to the vehicle body in the direction to increase the caster angle of the wheel, and a torque is generated between the wheel and the vehicle body which contributes to the reduction of the tendency of the vehicle to nose-dive by canceling the torque due to the braking action.

An important advantage can be gained by aligning the inner ends of the upper lateral link members substantially on a longitudinal line of the vehicle body; this eliminates the problems arising from the difficulty of offsetting the points of attachment of the lateral link members to the vehicle body along a lateral or vertical direction of the vehicle body.

According to yet another aspect of the present invention, the wheel carrier is provided with a vertically extending arm, and a pair of arms extending from a free end of the vertical arm, forwardly and rearwardly, respectively, along a longitudinal direction of the vehicle body, and the inner ends of the upper lateral link arms are pivotally attached to the longitudinal arms, respectively, each by way of a ball joint having a ball stud passed vertically through corresponding one of the longitudinal arms. Thus, the proper spacing of the outer ends of the upper lateral link members is made possible without making the wheel carrier unduly massive.

According to yet another aspect of the present invention, the lower lateral link device comprises a pair of lower lateral link members, arranged one behind the other, and the outer ends of the lower lateral link members are pivotally attached to the lower part of the wheel carrier by way of ball joints, the ball joints being provided with ball studs passed through the lower part of the wheel carrier from opposite directions along a line which is slanted with respect to a vertical line. Thus, the outer ends of the lower lateral link arms can be brought close to one another without causing interferences between the ball joints at the outer ends of the lower lateral link members.

According to yet another aspect of the present invention, the lower lateral link device comprises a pair of lateral link members, one placed behind the other, and the rear ones of the lower and upper lateral link members substantially align with the axle line of the wheel as projected on a horizontal plane. This provides a very high lateral rigidity. In particular, if the front, upper and lower lateral link members are inclined inwardly toward the front, and the ratio of their axial compliances is substantially equal to the ratio of their vertical distances from the center of the wheel, the caster angle becomes substantially free from external interferences.

According to yet another aspect of the present invention, there is provided a wheel suspension system, wherein an upper and a lower part of a wheel carrier, rotatably supporting a wheel, are coupled to a vehicle body by way of upper lateral link device and lower lateral link device, respectively, wherein: the lower lateral link device comprises a pair of lower lateral link members, arranged one behind the other, and the rear one of the lower lateral link members is more downwardly inclined than the front lower lateral link member as seen from the vehicle body.

This not only offers an anti-dive geometry but also, when the wheel consists of a steerable wheel, increases the margin by which the formation of a toggle between the knuckle arm of the wheel and the tie rod, which is pivotally coupled to the free end of the knuckle arm, is prevented during a cornering action. These effects are even more enhanced when the front lower lateral link member is substantially longer than the rear lower lateral link member.

According to yet another aspect of the present invention, the rear lower lateral link member extends substantially along the axle line of the wheel. This assures the lateral rigidity of the suspension system which contributes to the lateral stability of the vehicle. Preferably, the front lower lateral link member extends obliquely forwardly and inwardly as seen from the wheel carrier, and is provided with elastic device which permits elastic extension of the effective length of the front lower lateral link member. This assures the longitudinal compliance of the suspension system which contributes to a better riding comfort.

According to yet another aspect of the present invention, there is provided a wheel suspension system, wherein an upper and a lower part of a wheel carrier, rotatably supporting a wheel, are coupled to a vehicle body by way of a pair of upper lateral link members, one located behind the other, and a pair of lower lateral link members, one located behind the other, respectively, wherein: the front one of the lateral link members is more upwardly inclined than the rear lateral link member, for each of the pairs of lateral link members.

Thus, when the wheel moves toward the bump condition, the center of the contact surface between the wheel and the road surface moves forward substantially without involving any change in the caster angle; this not only produces an anti-dive effect but also stabilize the property of the suspension system even when the wheel moves vertically as a result of the cornering maneuvers of the vehicle. For instance, the vertical displacement of the wheel is prevented from affecting the force required to achieve or maintain a steering angle.

BRIEF DESCRIPTION OF THE DRAWINGS

Now the present invention is described in the following in terms of particular embodiments with reference to the appended drawings.

DETAILED DESCRIPTION OF THE PREFERRED EMBODIMENTS

Figure 1:
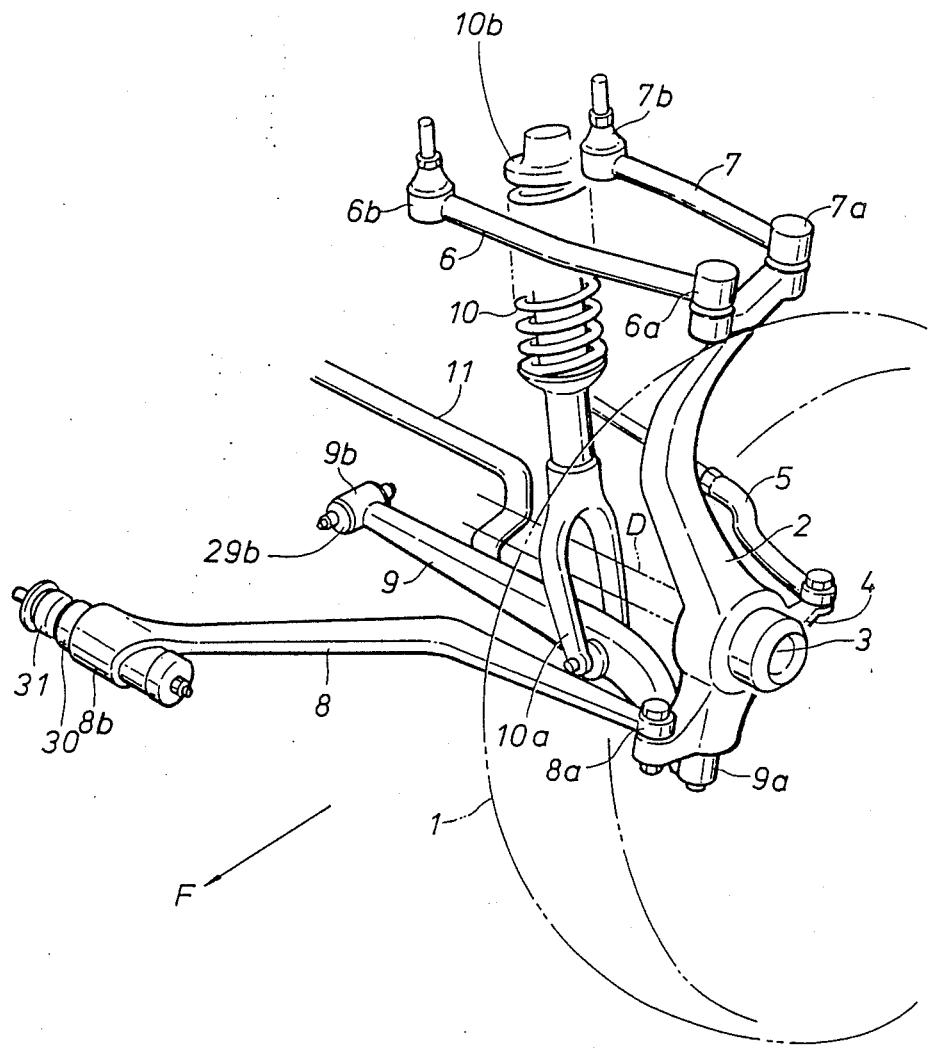
FIG. 1 is a perspective view of a steerable wheel to which the suspension system according to the present invention is applied.
Figure 2:
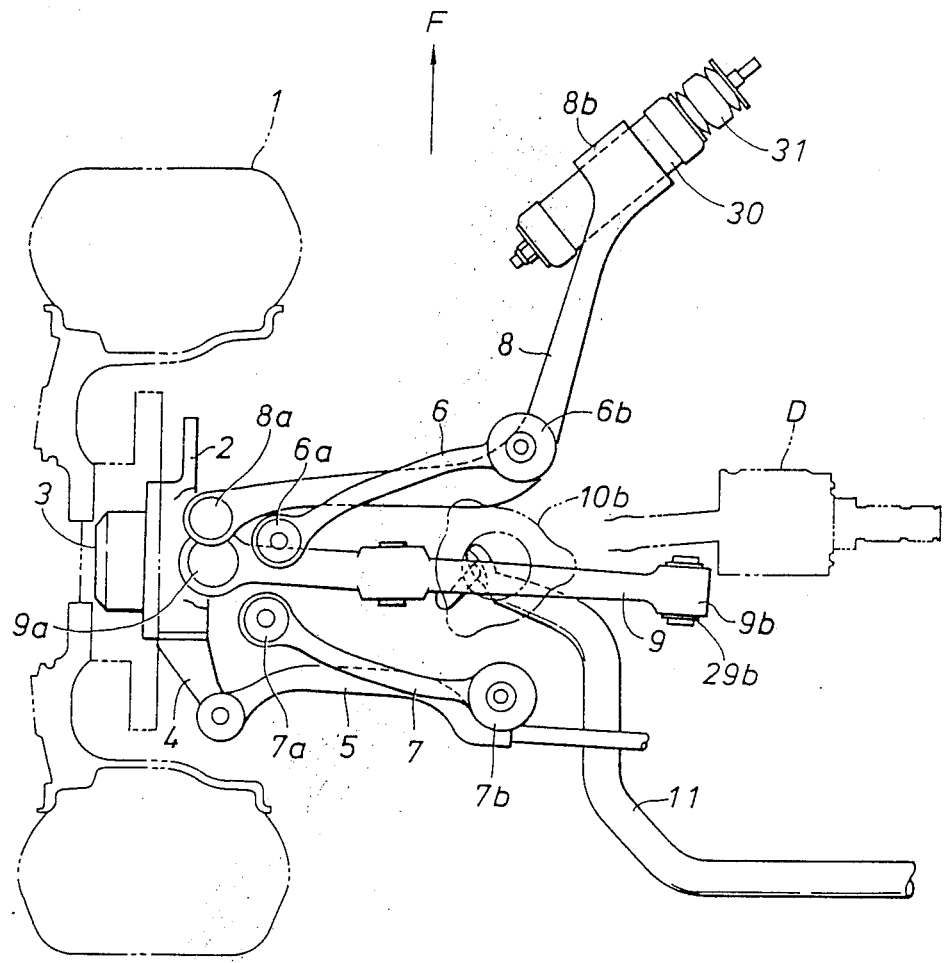
FIG. 2 is a plan view of the suspension system shown in FIG. 1.
Figure 3:
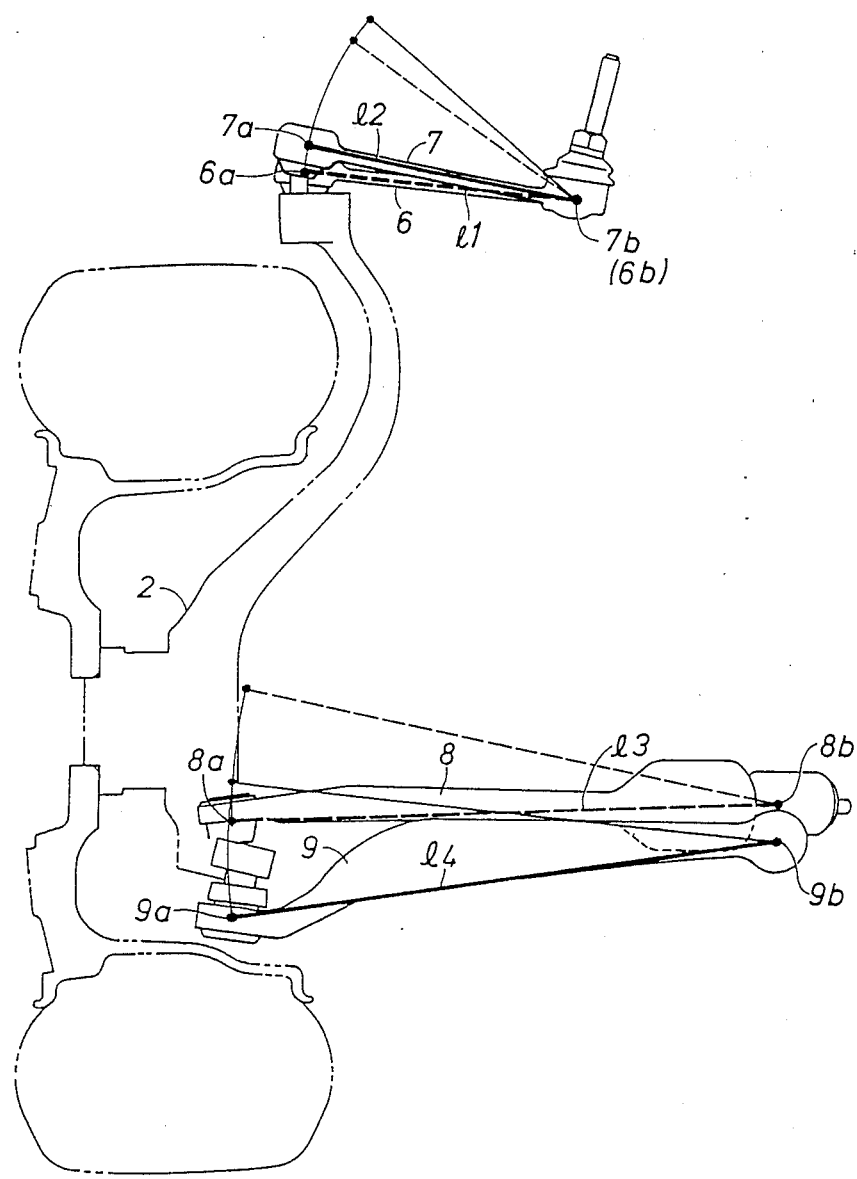
FIG. 3 is a rear view of the suspension system shown in FIG. 1.

FIGS. 1 through 3 show a wheel suspension system for a steerable and driven front wheel according to the present invention. The wheel 1 is attached to a drive shaft D which is rotatably supported by a bearing (not shown in the drawings) received in a central bore 3 provided in a central part of a wheel carrier 2. From a lower part of the wheel carrier 2 projects a knuckle arm 4 in a rearward direction, and a free end of the knuckle arm 4 is pivotally connected to an end of a tie rod 5.

Figure 4:
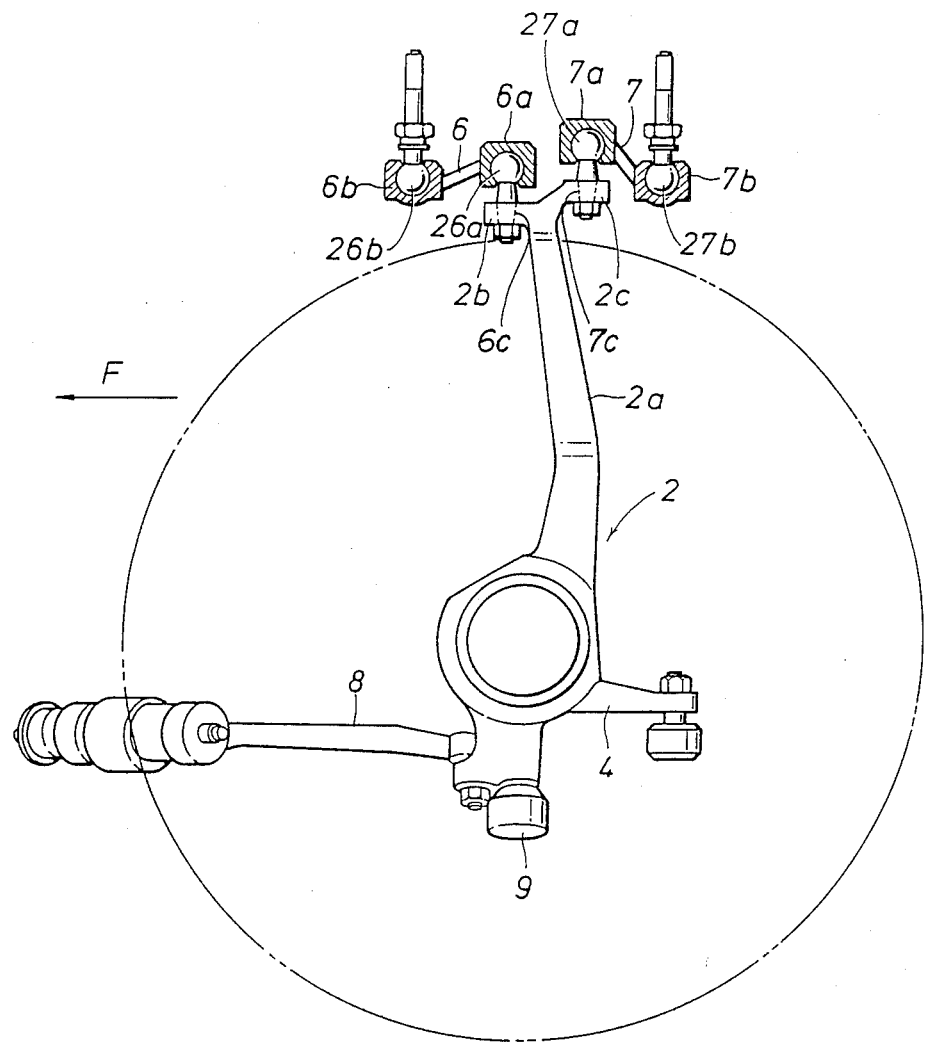
FIG. 4 is a fragmentary side view of an essential part of the suspension shown in FIG. 1, showing the ball joints provided between the upper link members and the wheel carrier in greater detail.

A front and a rear part of an upper part of the wheel carrier 2 are pivotally connected to outer ends 6a and 7a of upper lateral link members 6 and 7, respectively, each by way of ball joints 26a and 27a, while the inner ends 6b and 7b of these upper lateral link members 6 and 7 are connected to the vehicle body not shown in the drawings, each likewise by way of ball joints 26b and 27b, as best shown in FIG. 4. The wheel carrier 2 is provided with a vertical arm 2a which extend substantially vertically from the central part of the wheel carrier 2 and the free end or, in other words, the upper end of the vertical arm 2a is bifurcated into a pair of arms 2b and 2c which extend from a front and a rear part of the upper end of the wheel carrier 2, at different elevations, along the forward and the rearward direction, respectively, and the ball studs 6c and 7c of the ball joints 26a and 27a are passed downward through holes provided in these arms 2b and 2c with nuts threaded to the ball studs 6c and 7c from their lower ends.

Figure 5:
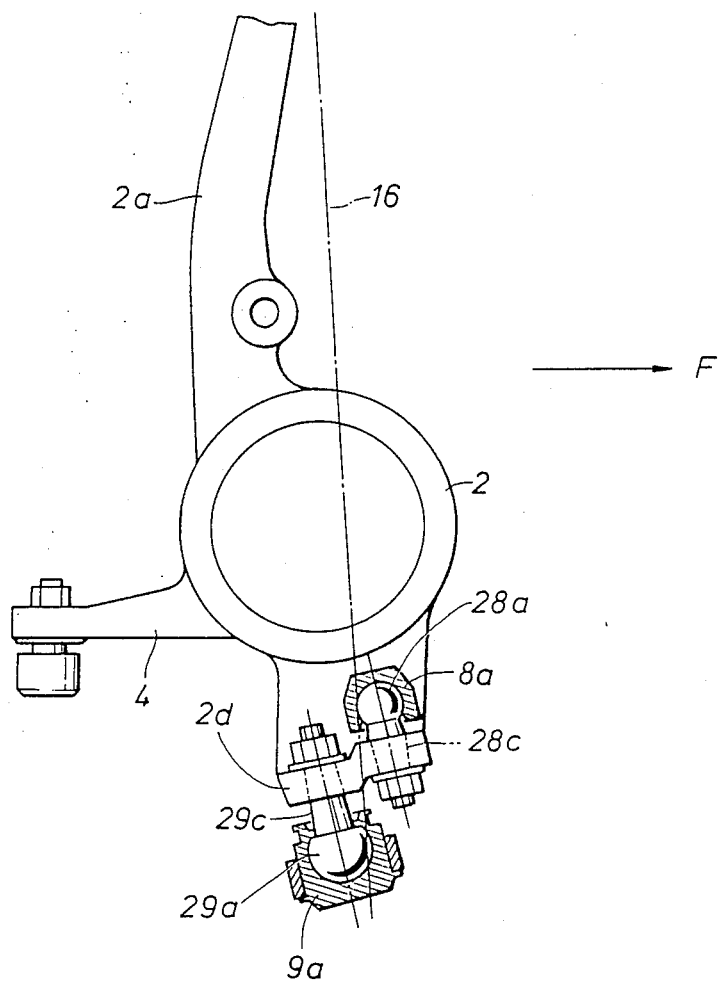
FIG. 5 is a fragmentary side view of an essential part of the suspension shown in FIG. 1, showing the ball joints provided between the lower link members and the wheel carrier in greater detail.

As shown in FIG. 5, a lower part of the wheel carrier is provided with a bracket 2d having a plate-like member which is slightly upwardly inclined toward the front with respect to a horizontal plane. The outer ends 8a and 9a of lower lateral link members 8 and 9 are pivotally connected to this bracket 2d by way of ball joints 28a and 29a having ball studs 28c and 29c which are passed through the plate-like member of the bracket 2d from opposite sides of the plate-like member and fastened thereto by nuts (FIG. 5). The inner ends 8b and 9b of the lower lateral link members 8 and 9 are connected to the vehicle body, the front lower lateral link member 8 by way of a damper 30 and a rubber bush 31, and the rear lower lateral link member 9 by way of a rubber bush 29b. The inner ends 8b and 9b of the lower lateral link members 8 and 9 may also be connected to the vehicle body by way of ball joints in the same manner as the outer ends 8a and 9a of the lower lateral link members 8 and 9 are connected to the wheel carrier 2, but since the angular displacements of these lower lateral link members 8 and 9 about their pivot points at the vehicle body along the horizontal plans which contain these lateral link members are so small that the angular displacements of the lower lateral link members 8 and 9 due to the steering action can be safely accommodated by the deformation of the rubber bushes 29b and 31.

The rear lower lateral link member 9 extends linearly substantially along the lateral direction of the vehicle body as projected on a horizontal plane while the front lower lateral link member 8 extends forwardly in an oblique manner so as to serve as a radius rod. A middle part of the rear lower lateral link member 9 is connected to a bifurcated lower end of a shock absorber 10 consisting of a coil spring and a hydraulic damper, and a part of the rear lower lateral link member 9, adjacent to the point where the shock absorber 10, is connected to an end of a stabilizer 11 consisting of a torsion spring. The upper end 10b of the shock absorber 10 is connected to the vehicle body not shown in the drawings and the upper lateral link members 6 and 7 extend obliquely forwardly and rearwardly with respect to the lateral direction of the vehicle body, respectively, so as not to interfere with the shock absorber 10.

The wheel 1 is supported so as to be able to move vertically, along with the wheel carrier 2, and the changes in its camber angle and toe angle depending on the vertical displacement of the wheel carrier 2 can be freely adjusted by appropriately selecting the lengths of the lateral link members 6 through 9 and the positions of the pivot points. The tie rod 5 transmits a steering force from a rack and pinion steering gear 21 (FIG. 9) to the wheel carrier 2 in the form of a lateral axial force, and the wheel 1 is steered about an imaginary king pin which is described hereinafter.

Figure 6:
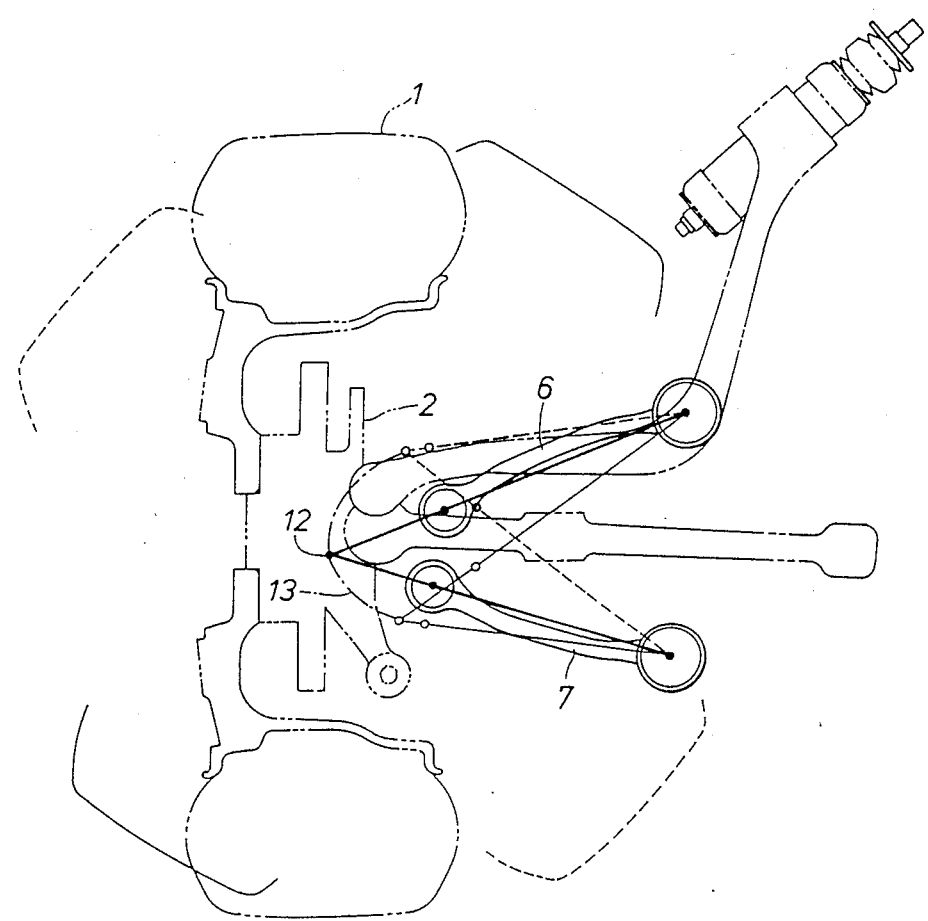
FIG. 6 is a skeleton diagram of the geometric relationship of the upper lateral link members.
Figure 7:
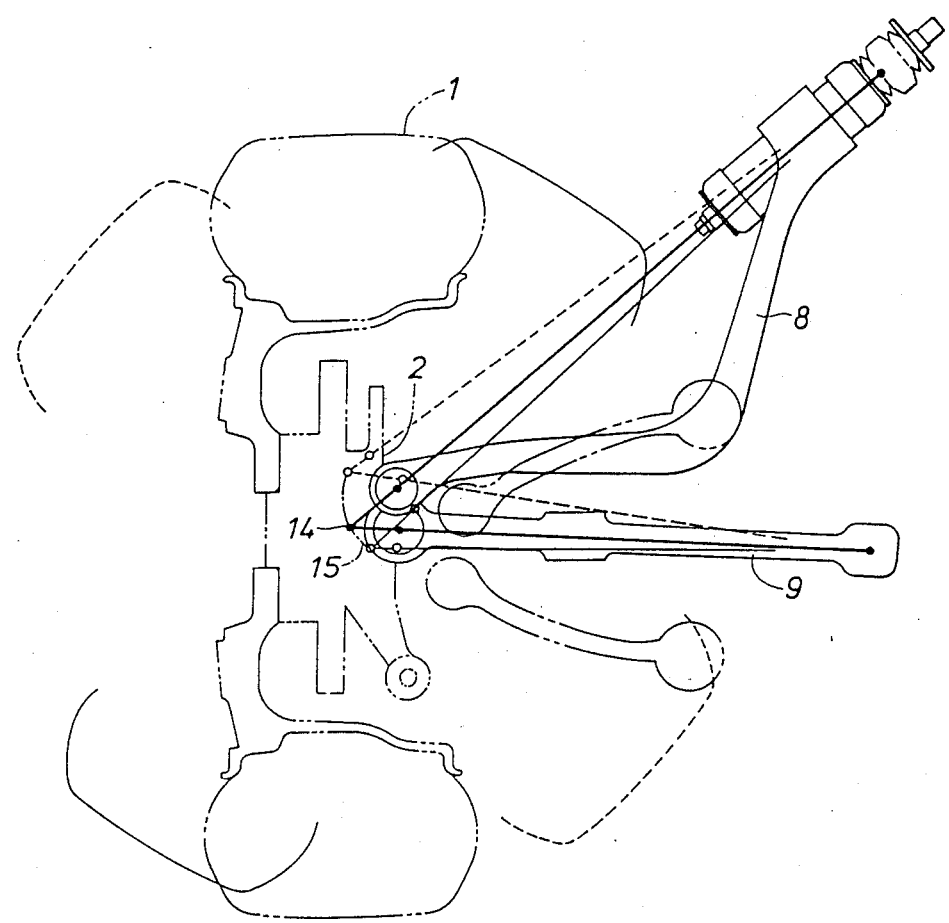
FIG. 7 is a skeleton diagram of the geometric relationship of the lower lateral link members.

When the upper lateral link members 6 and 7 are considered, an instantaneous center of rotation 12 of the upper part of the wheel carrier 2 is given as a trajectory 13 of the intersection of the lines each of which passes through the pivot points at the ends of one of the upper lateral link members 6 and 7 as shown in FIG. 6. When the lower lateral link members 8 and 9 are considered, an instantaneous center of rotation 14 of the lower part of the wheel carrier 2 is given as a trajectory 15 of the intersection of the lines each of which passes through the pivot points at the ends of one of the lower lateral link members 8 and 9 as shown in FIG. 7. Therefore, the central line of rotation of the wheel carrier 2 or, in other words, the imaginary king pin is given as the line connecting these instantaneous centers of rotation 12 and 14.

As well known, an anti-dive effect can be obtained by increasing the caster angle of the front wheels as they move toward the bump condition. Thus, according to the present invention, as best shown in FIGS. 3 and 4, the inner ends 6b and 7b of the front and rear upper lateral link members 6 and 7 which are pivoted to the vehicle body are arranged at a substantially same elevation while the outer ends 6a and 7a adjacent to the wheel carrier 2 are arranged so as to be higher in the rear 7a than in the front 6a.

Figure 8:
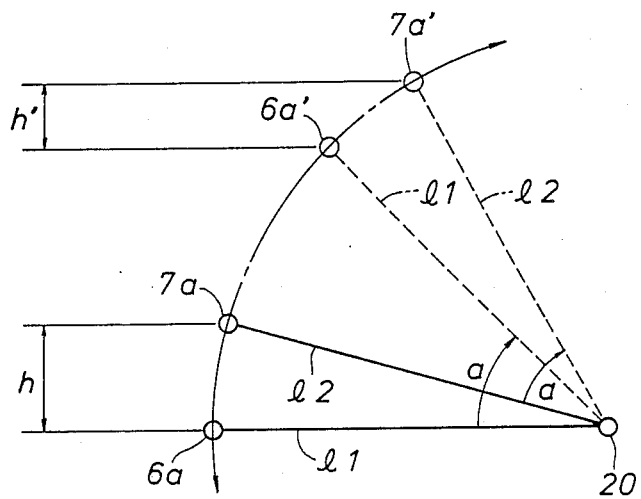
FIG. 8 is an illustrative view showing the difference in the distances covered by the outer ends of the upper link members.

FIG. 8 schematically shows the relationship between the two upper lateral link members 6 and 7, and conceptually demonstrates how the rotations of the outer ends 6a and 7a of the upper lateral link members 6 and 7 about a line 20 which passes through the inner ends 6b and 7b of the upper lateral link members 6 and 7 produces a difference in the vertical components of the travels of the outer ends 6a and 7a. Since the outer ends 6a and 7a are different in elevation and a rotational phase difference is thereby produced about the center of rotation 20, the front being lower than the rear, the difference h between the elevations of the outer ends 6a and 7a of the upper lateral link members 6 and 7 when the suspension system is in neutral state is greater than the corresponding difference h' between the elevations of the outer ends 6a' and 7a' of the upper lateral link members 6' and 7' when the suspension system is in more compressed state (when the wheel has moved toward the bump condition from the neutral position). Here, it is assumed that the two upper lateral link members 6 and 7 rotate by a same upward rotational angle a, but it is true only as an approximation because the lateral links generally undergoes three dimensional movements which cannot be represented graphically in a simple manner.

On the other hand, since the outer ends 6a and 7a are connected to the upper part of the wheel carrier 2 which consists of a rigid body, the distance between them along the fore-and-aft direction is mechanically fixed. Therefore, as the upper lateral link members 6 and 7 rotate upwards, the wheel carrier 2 is turned in the direction opposite to the normal turning direction of the wheel 1. This means that the wheel carrier 2 is tilted backward or, in other words, the caster angle increases as the wheel moves toward the bump condition.

As well known, this dynamic change in the caster angle of the wheel produces a reaction between the wheel and the vehicle body which, by opposing the torque produced by a braking action, reduces the tendency of the front part of the vehicle body to dive.

Various approaches have heretofore been proposed to achieve such a dynamic change in the caster angle but they required complex layouts of the inner ends of the link members which are pivoted to the vehicle body, and the chassis frame structures based on these approaches therefore tended to be highly complex. On the other hand, according to the present invention, as described above, the pivot points of the upper lateral link members on the vehicle body are aligned on a longitudinal line of the vehicle body without involving any offsetting along the vertical or lateral direction, and the chassis frame design is thus simplified.

Figure 9:
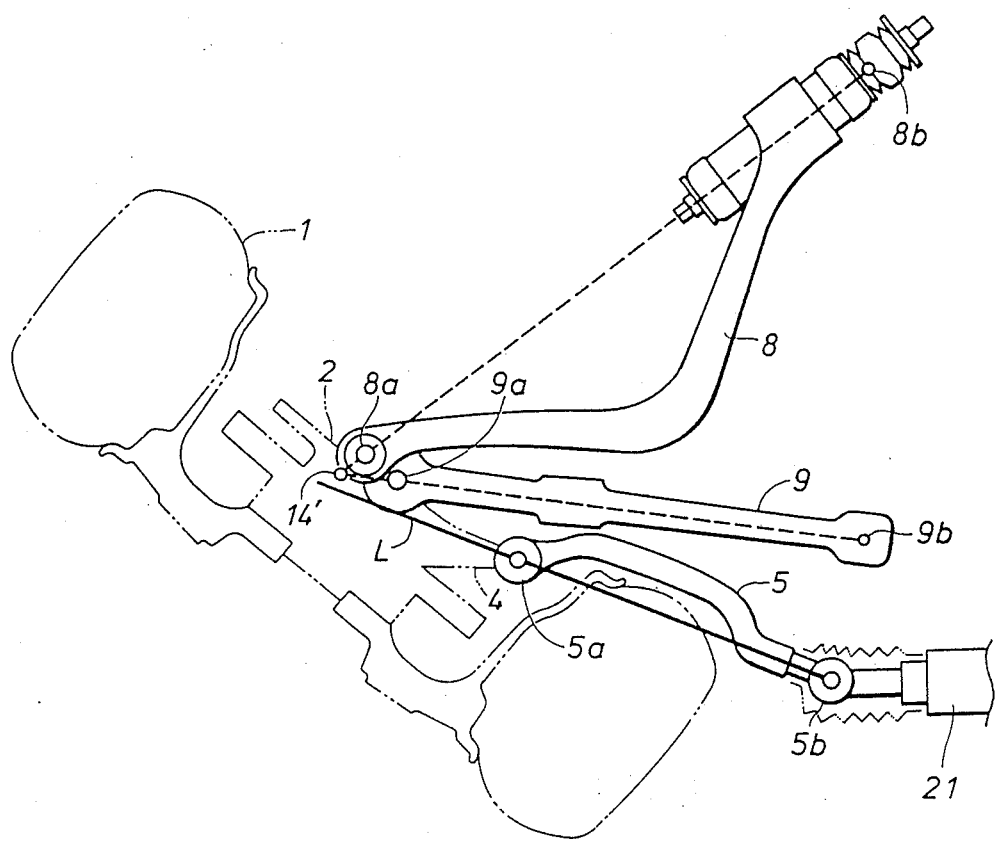
FIG. 9 is a plan view of an inner wheel during a cornering action for illustrating the generation of a toggle-like relationship.

When the inner wheel of a suspension system in which the tie rod is provided behind and below its axle is steered to its limit, as shown in FIG. 9, the center of rotation 14 or, in other words, the intersection between the king pin and the plane containing the two lower lateral link members 8 and 9 comes close to an extension of the line connecting the two pivot points 5a and 5b of the tie rod 5. This means that the tie rod 5 and the knuckle arm 4 tend to form a toggle.

The toggle margin can be maximized by increasing the dimensions of the knuckle arm 4 and the tie rod 5, or reducing the forward displacement of the imaginary king pin, but increasing the sizes of the knuckle arm and the tie rod is not preferable for layout reasons. Therefore, according to the present invention, based on the fact that the inner wheel tends to be in a rebound condition during a cornering action, the geometrical arrangement of the lower lateral link members is so selected that the caster angle of the wheel 1 is reduced as the wheel moves toward the rebound condition.

Figure 10:
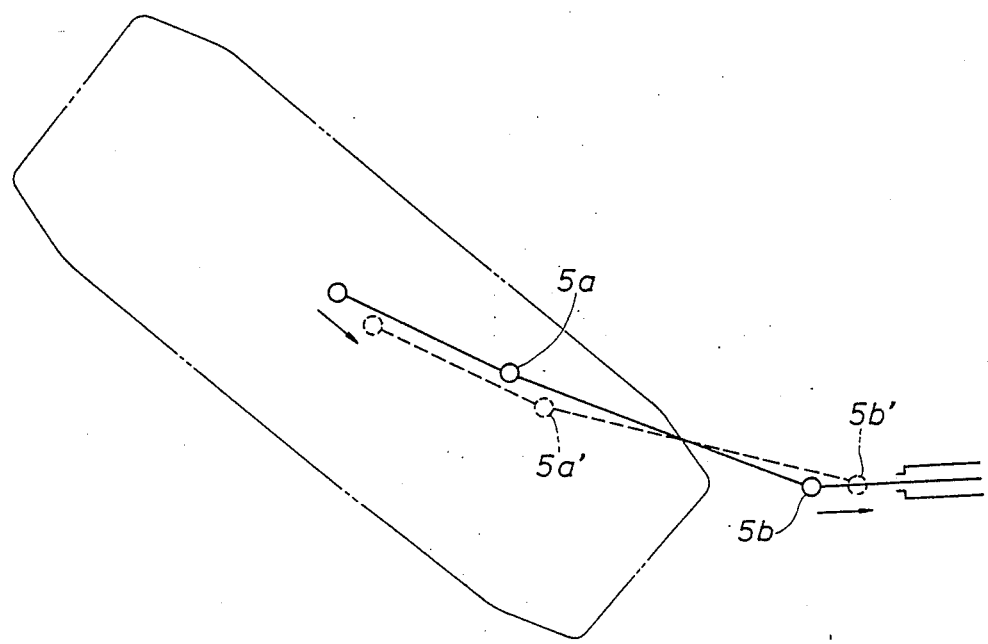
FIG. 10 is a skeleton diagram illustrating how the toggle margin is increased according to the present invention.

As best shown in FIG. 3, the line $l_3$ connecting the two ends 8a and 8b of the front lower lateral link member 8 in a natural state extends substantially horizontally whereas the line $l_4$ connecting the two ends 9a and 9b of the rear lower lateral link member 9 is given with a downward inclination as seen from the center of the vehicle. Thus, as the wheel 1 moves toward the rebound condition (the extended condition of the suspension system), the front part of the wheel carrier 2 drops more than the rear part of the same does, and the caster angle is hence reduced or, in other words, the imaginary king becomes more upright. At the same time, this in turn causes the lower part of the imaginary king pin, as well as the knuckle arm 4, to move rearwardly. Thus, as schematically illustrated in FIG. 10, it is made possible to steer the wheel by a large angle or, in other words, the toggle margin is increased as the wheel moves toward the rebound condition.

Conversely, as the wheel moves towards the bump condition, since the instantaneous center of rotation 14 of the lower part of the wheel carrier 2 moves forwardly and the caster angle increases or, in other words, the imaginary king pin tilts backwardly. This produces an anti-dive effect. Particularly when this anti-dive effect is combined with the anti-dive effect produced by the favorable arrangement of the upper lateral link members 6 and 7 as previously described in conjunction with FIGS. 3 and 8, a highly desirable result can be obtained.

Now, in such a suspension system, rubber bushes are typically interposed in the coupling points between the vehicle body and the lateral link members to isolate the vehicle body from vibrations and noises. If the compliance of these rubber bushes are high, the riding comfort of the vehicle running on a flat road surface is improved, but the driving stability such as the yaw response of the vehicle during a cornering action tends to be impaired. Therefore, according to the present invention, by interposing a damper having a sufficient compliance in the outer or the front end 8b of the front lower lateral link member 8 which is pivotally attached to the vehicle body and arranging the rear lower lateral link member 9 substantially laterally to the vehicle body, a sufficient longitudinal compliance and a sufficient lateral rigidity are both attained.

Figure 11:
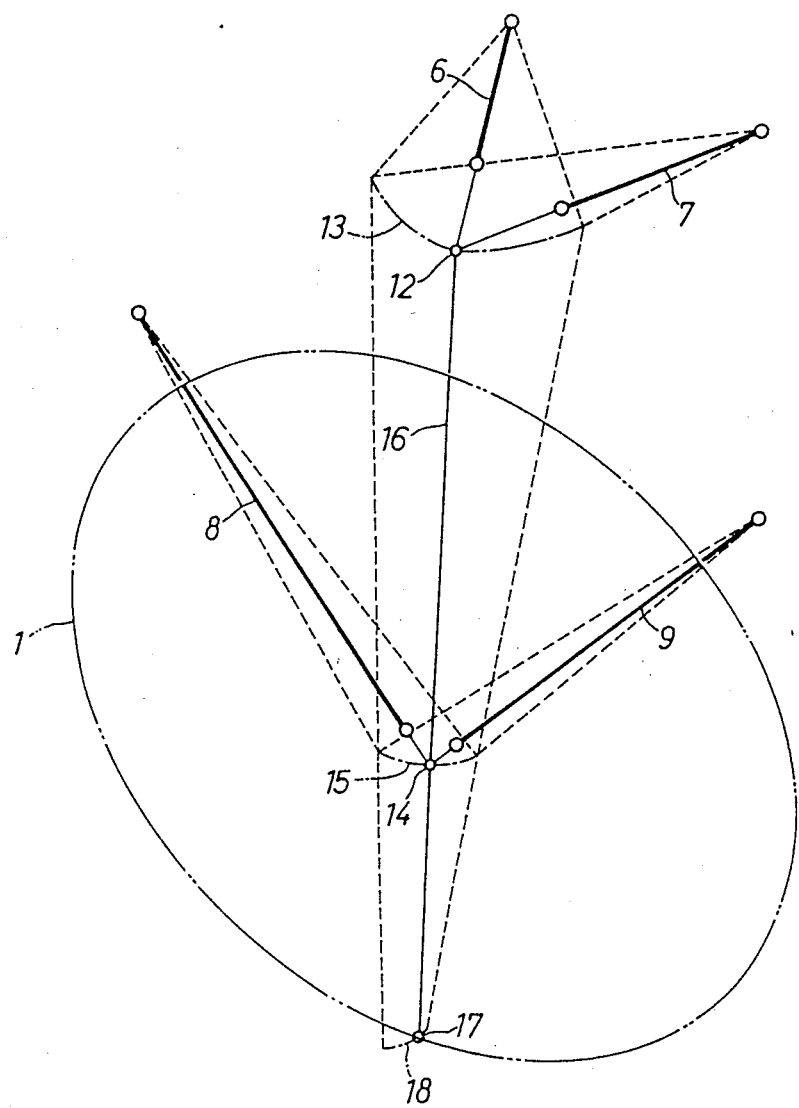
FIG. 11 is a skeleton diagram for a three-dimensional illustration of the geometric relationship of the imaginary king pin.

In the above described embodiment, since the trajectory 13 of the upper instantaneous center of rotation 12 is relatively long while the trajectory 15 of the upper instantaneous center of rotation 14 is relatively short, as shown in FIG. 11, the position of the imaginary king pin 16 during a steering action changes along a substantially conical surface created by a generatrix consisting of the axial line of the imaginary king pin 16, and the travel of the trajectory 18 of the intersection 17 between the imaginary king pin 16 and the road surface is thereby minimized.

In order to obtain such a dynamic displacement of the imaginary king pin, the spacing between the pivot points as given by the ball joints 28a and 29a provided at the outer ends 8a and 9a of the lower lateral link members 8 and 9 adjacent to the wheel carrier 2 is desired to be minimized. Therefore, according to the present invention, as shown in FIG. 5, the ball joint 28a which connects outer end of the front lower lateral link member 8 with the wheel carrier 2 is coupled thereto with its ball stud 28c passed through the bracket 2d from above while the ball joint 29a which connects the outer end 9a of the rear lower lateral link member 9 with the wheel carrier 2 is coupled thereto with its ball stud 29c passed through the bracket 2d from below. Further, these ball studs 28c and 29c have parallel axial lines which incline rearwardly as seen from a side of the vehicle so as to bring the centers of the balls of these ball joints closer to the imaginary king pin 16.

When a plurality of ball joints are to be arranged next to another, the spacing between them is dictated by the diameters of the ball sockets, but, as shown in the present embodiment, by fitting the ball studs 28c and 29c from mutually opposing directions along the slanted axial lines, the pivot spacing can be reduced to a small value.

In order to obtain the above mentioned behavior of the imaginary king pin, it is necessary for the ball joints 26a and 27a provided at the ends of the upper lateral link members 6 and 7 adjacent to the wheel carrier 2 to be close to the wheel 1 and for the spacing therebetween to be relatively large. Therefore, according to the present invention, as shown in FIG. 4, the arms 2b and 2c extend from a front and a rear part of an upper end of the wheel carrier 2 along the forward and the rearward direction, respectively, and the ball studs 26c and 27c of the ball joints 26a and 27a are passed downward through the holes provided in these arms 2b and 2c with the nuts threaded to the ball studs 26c and 27c from their lower ends.

It is conceivable to mount the ball studs 26c and 27c along a horizontal direction either from the center of the vehicle body or from the front and the rear. However, the former approach has the shortcoming that it imposes some restrictions on the radii of rotation of the upper lateral link members. As for the latter approach, since the balls incessantly rotate relative to their sockets about the axial line of the ball studs, some problems may arise concerning the durability of their seal members which would be subjected to twisting deformations. These considerations apply equally to the ball joints 28a and 29a provided in the lower part of the wheel carrier 2.

Figure 12:
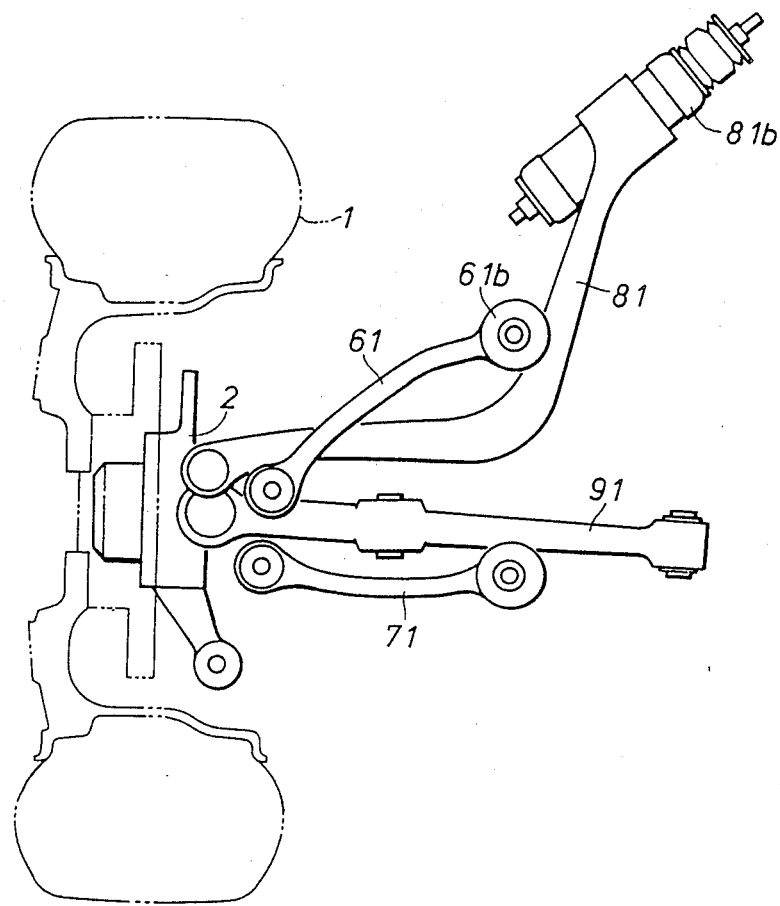
FIGS. 12 and 13 are a simplified plan view and rear view showing a modified embodiment of the present invention.
Figure 13:
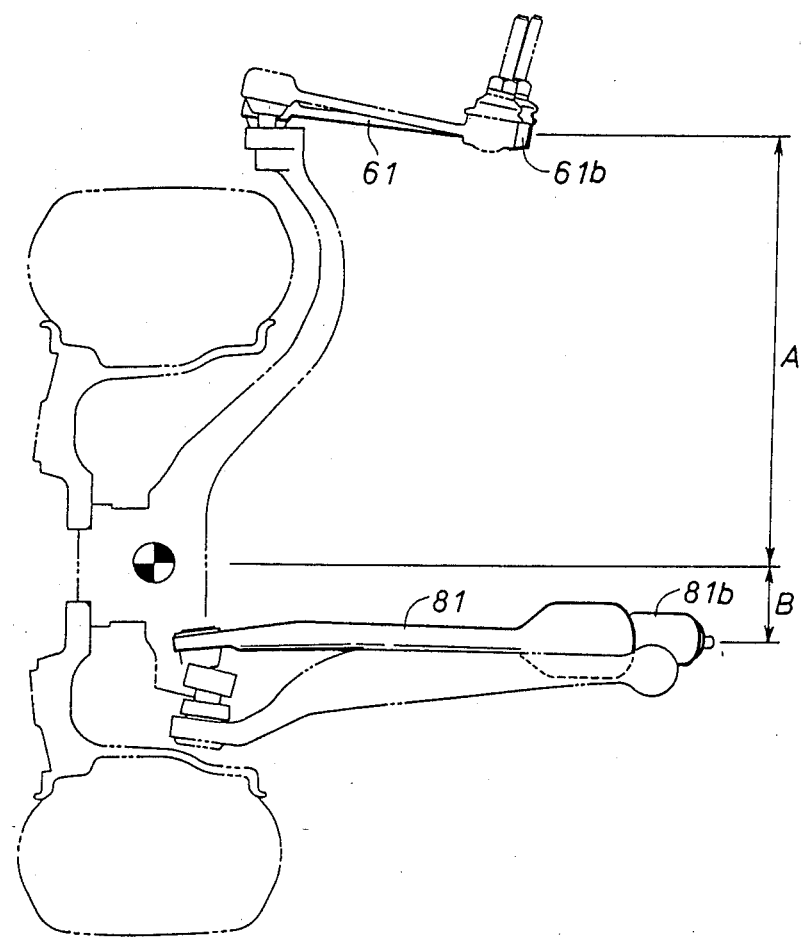

FIGS. 12 and 13 show a modified embodiment of the present invention. In this embodiment, the front lateral link members 61 and 81 both extend obliquely relative to the vehicle body while the rear lateral link member 71 and 81 are both arranged laterally with respect to the vehicle body. In this case, if the ratio of the compliances of the rubber bushes for the inner ends 61b and 81b of the front, upper and lower lateral link members is made equal to the ratio of their distances from the center of the wheel (A:B), owing to the equilibrium between the moment around the center of the wheel and the deformation of the rubber bushes, the change in the caster angle can be controlled to a very small value.

Figure 14:
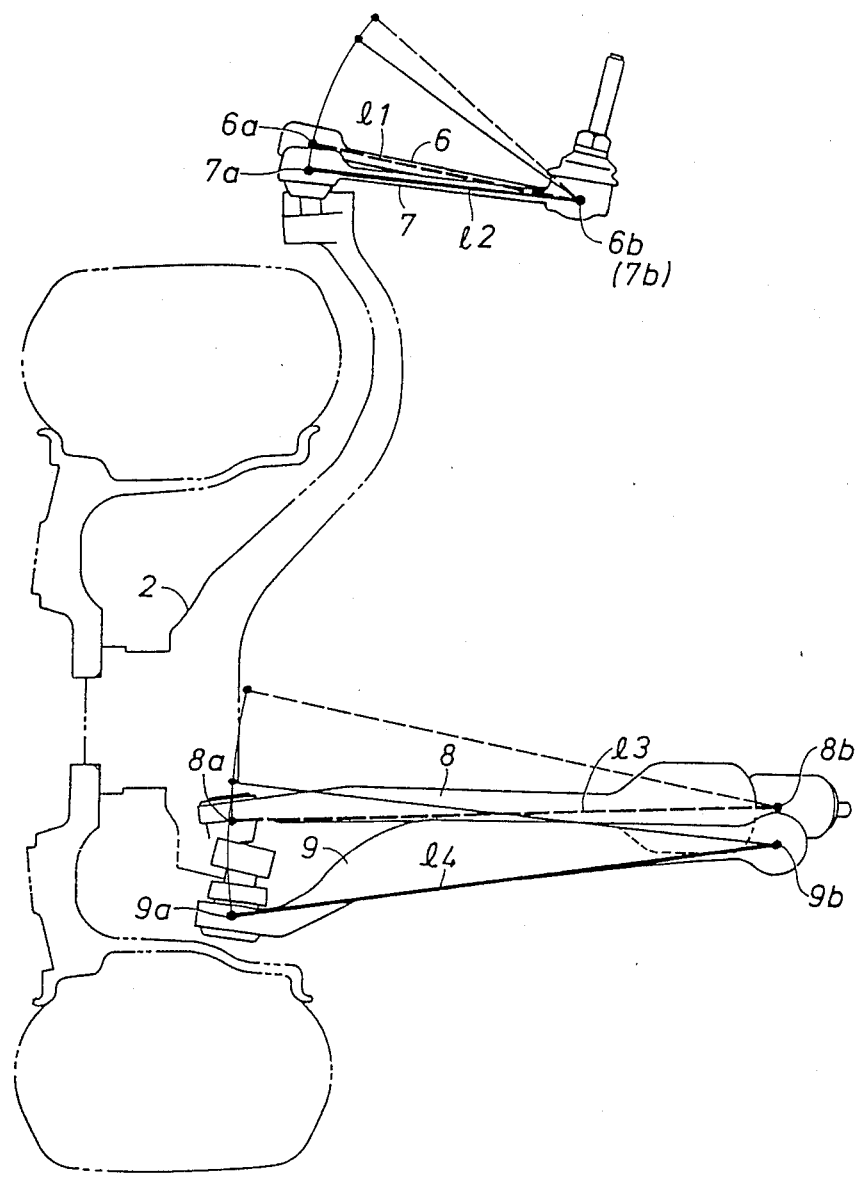
FIG. 14 is a rear view of another modified embodiment of the present invention.

FIG. 14 shows yet another embodiment of the present invention. In FIG. 14, the parts corresponding to those of the preceding embodiments are denoted with like numerals. This embodiment is similar to the embodiment shown in FIGS. 1 through 3. According to this embodiment, however, the outer end 7a of the rear upper lateral link member 7 is pivotally attached to the hub carrier 2 at a lower point than the outer end 6a of the front upper lateral link member 6. Therefore, when the wheel 1 moves toward the bump condition, the upper part and the lower part of the wheel carrier 2 are both displaced forwardly with respect to the vehicle body, and this produces an anti-dive effect. This is advantageous because the caster angle may remain constant irrespective of the vertical displacement of the wheel, and the force required to maintain and/or accomplish a steering angle is not affected by the condition of the suspension system.

Therefore, the overall effect is that the imaginary king pin, consisting of the line connecting the instantaneous centers of rotation of the upper and the lower part of the wheel carrier as given by the intersections of the upper and lower lateral link members 6, 7, 8 and 9, is pulled forward by the front lateral link members 6 and 8 as the wheel moves toward the bump condition, and is moved forwardly in a substantially parallel manner. As a result, the wheel 1 along with the wheel carrier 2 moves forwardly and the wheel contact area moves forwardly during a bump condition with the result that a high anti-dive effect is produced. Thus, by moving the contact area of the wheel with the road surface to the forward when a braking action has taken place, an anti-dive effect can be attained. In other words, since the wheel base is extended in effect when a braking action has taken place, the nose of the vehicle becomes less prone to dive.

Although the present invention has been shown and described with reference to the preferred embodiments thereof, it should not be considered as limited thereby. Various possible modifications and alterations could be conceived of by one skilled in the art to any particular embodiment, without departing from the spirit of the invention.

What we claim is:

1. A wheel suspension system comprising:
   a wheel carrier, rotatably supporting a wheel, said wheel carrier having an upper part and a lower part which are coupled to a vehicle body by way of an upper lateral link means and a lower lateral link means, respectively,
   said upper lateral link means includes a pair of upper lateral link members, arranged one behind the other, having inner ends of said upper lateral link members pivotally attached to said vehicle body at a substantially same elevation and having outer ends pivotally attached to said wheel carrier at mutually different elevations.

2. A wheel suspension system as defined in claim 1, wherein an outer end of a front upper lateral link member is placed at a substantially same elevation as said inner ends while said outer end of a rear upper lateral link member is located higher than said outer end of said front upper lateral link member when said wheel suspension system is in a neutral state.

3. A wheel suspension system as defined in claim 2, wherein said inner ends of said upper lateral link members are substantially aligned on a longitudinal line of said vehicle body.

4. A wheel suspension system as defined in claim 3, wherein said wheel carrier is provided with a vertically extending arm, and a pair of arms extending from a free end of said vertical arm, forwardly and rearwardly, respectively, along a longitudinal direction of said vehicle body, and said inner ends of said upper lateral link members are pivotally attached to said pair of arms, respectively, each by way of a ball joint having a ball stud passed vertically through corresponding one of said pair of arms.

5. A wheel suspension system as defined in claim 4, wherein said lower lateral link means comprises a pair of lower lateral link members, arranged one behind the other, and outer ends of said lower lateral link members are pivotally attached to said lower part of said wheel carrier by way of ball joints, said ball joints being provided with ball studs passed through said lower part of said wheel carrier from opposite directions along a line which is slanted with respect to a vertical line.

6. A wheel suspension system as defined in claim 3, wherein said lower lateral link means comprises a pair of lateral link members, one placed behind the other, and the rear lower and upper lateral link members are substantially align with an axle line of said wheel as projected on a horizontal plane.

7. A wheel suspension system as defined in claim 6, wherein front upper and lower lateral link members are inclined inwardly toward a front of the vehicle body, and a ratio of axial compliances of said front upper and lower lateral link members is substantially equal to a ration of vertical distances of said front upper and lower lateral link members from a center of said wheel.

8. A wheel suspension system comprising:
   a wheel carrier, rotatably supporting a wheel, said wheel carrier having an upper and a lower part which are coupled to a vehicle body by way of an upper lateral link means and a lower lateral link means, respectively, wherein
   said lower lateral link means comprises a pair of lower lateral link members, arranged one behind the other, and a rear one of said lower lateral link members is more downwardly inclined than a front lower lateral link member as seen from said vehicle body, said pair of lower lateral link members have ends pivotally attached to said wheel carrier at mutually different elevations.

9. A wheel suspension system as defined in claim 8, wherein, outer ends of said lower lateral link members are pivotally attached to said lower part of said wheel carrier by way of ball joints, said ball joints being provided with ball studs passed through said lower part of said wheel carrier from opposite directions along a line which is slanted with respect to a vertical line.

10. A wheel suspension system as defined in claim 8, wherein said front lower lateral link member is substantially longer than said rear lower lateral link member.

11. A wheel suspension system as defined in claim 10, wherein said rear lower lateral link member extends substantially along an axle line of said wheel as projected on a horizontal line.

12. A wheel suspension system as defined in claim 10, wherein said front lower lateral link member extends obliquely forwardly and inwardly as seen from said wheel carrier, and is provided with an elastic means which permits elastic extension of an effective length of said front lower lateral link member.

13. A wheel suspension system as defined in claim 8, wherein said wheel carrier is provided with a knuckle arm extending rearwardly from a part thereof which is lower than a center of said wheel.

14. A wheel suspension system comprising:
   a wheel carrier, rotatably supporting a wheel, said wheel carrier having an upper and a lower part which are coupled to a vehicle body by way of a pair of upper lateral link members, one located behind the other, and a pair of lower lateral link members, one located behind the other, respectively, wherein
   a front one of said lateral link members is more upwardly inclined than a rear lateral link member for each of said pairs of lateral link members.

15. A wheel suspension system as defined in claim 14, wherein, said wheel carrier is provided with a vertically extending arm, and a pair of arms extending from a free end of said vertical arm, forwardly and rearwardly, respectively, along a longitudinal direction of said vehicle body, and inner ends of said upper lateral ink arms are pivotally attached to said pair of arms, respectively, each by way of a ball joint having a ball stud passed vertically through a corresponding one of said pair of arms.

16. A wheel suspension system as defined in claim 15, wherein, outer ends of said lower lateral link members are pivotally attached to said lower part of said wheel carrier by way of ball joints, each of said ball joints being provided with a ball stud and said ball studs being passed through said lower part of said wheel carrier from opposite directions along a lien which is slanted with respect to a vertical line.

* * * * *